United States Patent [19]

Mohuchy

[11] Patent Number: 4,937,582
[45] Date of Patent: Jun. 26, 1990

[54] POLARIZATION ADAPTIVE ACTIVE APERTURE SYSTEM

[75] Inventor: Wolodymyr Mohuchy, Nutley, N.J.

[73] Assignee: ITT Corporation, New York, N.Y.

[21] Appl. No.: 382,819

[22] Filed: Jul. 19, 1989

[51] Int. Cl.$^5$ .............................................. G01S 7/42
[52] U.S. Cl. ...................................... 342/188; 342/13
[58] Field of Search ..................... 342/13, 15, 187, 188

[56] References Cited

U.S. PATENT DOCUMENTS

| | | |
|---|---|---|
| 4,005,425 | 1/1977 | Nagy . |
| 4,030,048 | 6/1977 | Foldes . |
| 4,766,435 | 8/1988 | Wells . |
| 4,849,762 | 7/1989 | Barnes . |

Primary Examiner—Thomas H. Tarcza
Assistant Examiner—Mark Hellner
Attorney, Agent, or Firm—Thomas N. Twomey

[57] ABSTRACT

Polarization adaptive active aperture system includes a receive polarimeter: (a) for determining the polarization parameters of a free space incoming RF signal and (b) for sampling and determining the polarization parameters of a transmitted RF signal which is generated by a transmit polarimeter. The polarization parameters determined by the receiving polarimeter as a result of sampling the signal generated by the transmit polarimeter are used to adaptively alter the output generated by the transmit polarimeter until that output has polarization parameters which match the polarization parameters of the free space incoming RF signal.

13 Claims, 4 Drawing Sheets

POLARIZATION ADAPTIVE ACTIVE APERTURE SYSTEM

Technical Field of the Invention

The present invention pertains to radar systems and, in particular, to polarization adaptive active aperture systems that can be deployed as a single radiating element or as an element of a phased array system.

Background of the Invention

Radar electronic countermeasures systems which use power amplification devices for transmitting such as traveling wave tubes (TWT) are generally large and expensive. In addition, polarimeters which have been utilized in such systems in the prior art typically have utilized waveguide structures which include ferrite phase control devices to obtain sufficient bandwidth and sufficient accuracy to provide accurate polarization measurements. Such approaches result in major disadvantages which occur as a result of the large size of the elements of the systems and the large processing time and manufacturing costs incurred in fabricating them. These disadvantages have limited the manner and nature of the deployment of such systems.

As a consequence of the above, many attempts in the art have been made and are still being made to solve the above-identified problems by utilizing a monolithic approach in fabricating elements which comprise radar systems. The monolithic approach attempts to overcome the disadvantages of the prior art by utilizing emerging solid state/microwave integrated circuit technology to fabricate polarimeters to measure the polarizations of incoming RF signals and to fabricate elements in RF processing chains and digital control systems which are used with the polarimeters. Notwithstanding the advantage of smaller size, circuits produced by utilizing solid state/microwave integrated circuit technology also suffer from certain problems. For example, circuits which are fabricated by utilizing such technology suffer from problems of non-reciprocity, poor frequency linearity and inadequate device repeatability.

As a result, there is a need in the art for a polarization active aperture system which preferably includes circuits produced by utilizing solid state/microwave integrated circuit technology without suffering from problems of non-reciprocity, poor frequency linearity and inadequate device repeatability.

Summary of the Invention

Embodiments of the present invention advantageously satisfy the above-identified need in the art by providing lower cost and reduced size polarization adaptive active aperture systems which preferably comprise circuits fabricated by utilizing solid state/microwave integrated circuit technology without suffering from problems of nonreciprocity, poor frequency linearity and inadequate device repeatability.

In particular, embodiments of the present invention utilize an adaptive polarimeter to overcome the deficiencies of the solid state devices. Specifically, a polarization adaptive active aperture system fabricated in accordance with the present invention comprises a receive polarimeter: (a) for determining the polarization parameters of a free space incoming RF signal and (b) for sampling and determining the polarization parameters of a transmitted RF signal which is generated by a transmit polarimeter. The polarization parameters determined by the receiving polarimeter as a result of sampling the signal generated by the transmit polarimeter are used to adaptively alter the output generated by the transmit polarimeter until that output has polarization parameters which match the polarization parameters of the free space incoming RF signal.

As one can readily appreciate, although the adaptive alteration of the transmit polarimeter output in accordance with the present invention may be utilized with any technology, the present invention advantageously permits one to utilize solid state/microwave integrated circuit technology without suffering from problems of non-reciprocity, poor frequency linearity and inadequate device repeatability. Further, although embodiments of the present invention may comprise polarimeters which embody any one of a large number of different methods for determining polarization parameters, preferred embodiments of the present invention comprise polarimeters which utilize a null detection method for determining polarization parameters. Still further, although one can fabricate embodiments of the present invention which utilize dual-polarizing elements which detect arbitrary pairs of polarization components, preferred embodiments of the present invention comprise dual-polarizing elements which detect substantially orthogonal polarizations.

Brief Description of the Figures

A complete understanding of the present invention may be gained by considering the following detailed description in conjunction with the accompanying drawing in which.

To facilitate understanding, identical reference numerals have been used to denote identical elements common to the figures.

Detailed Description of the Figures

Figure 1:
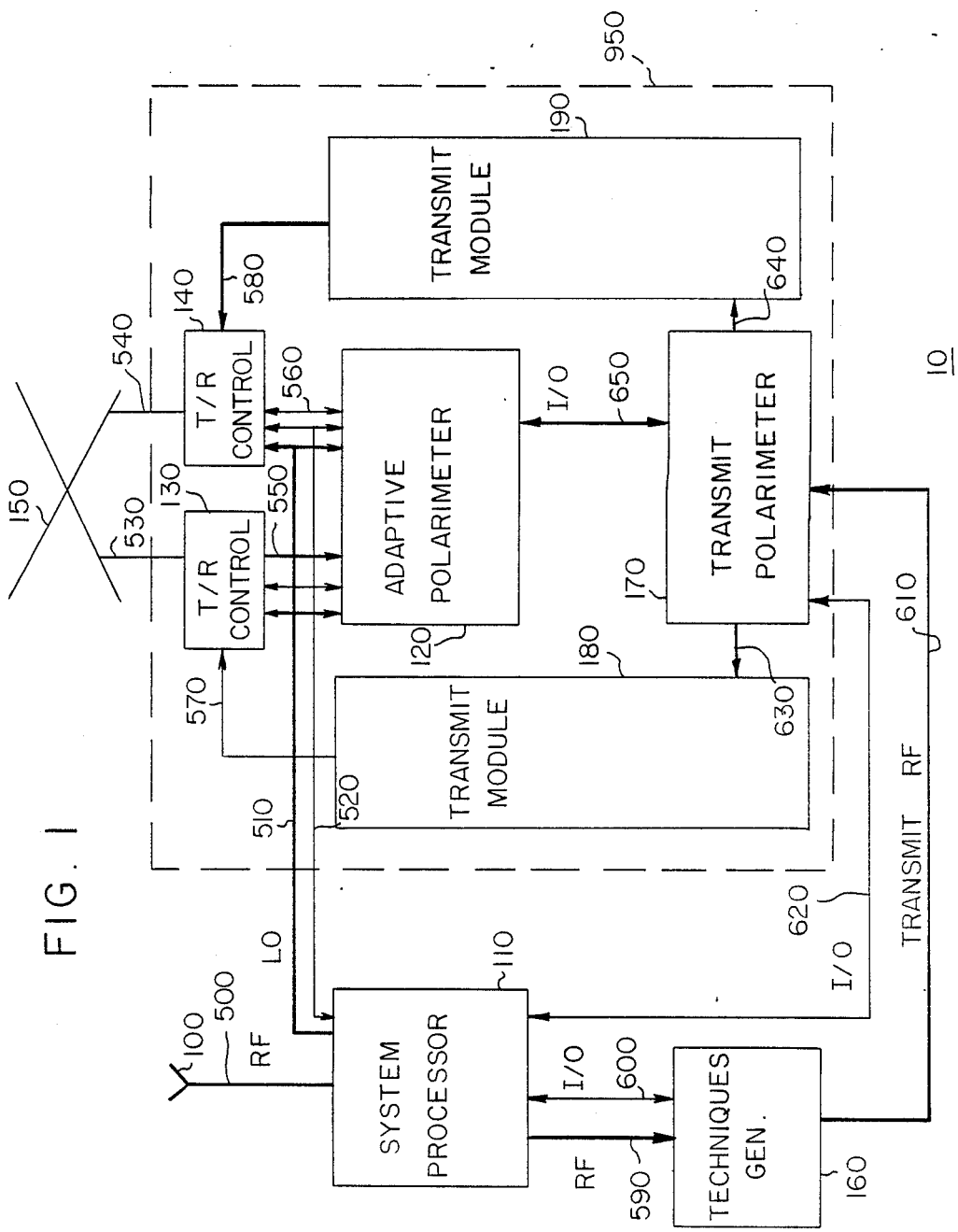
FIG. 1 shows a block diagram of an embodiment of the inventive polarization adaptive active aperture system.

FIG. 1 shows a block diagram of embodiment 10 of the inventive polarization adaptive active aperture system. Sensor antenna 100 is an antenna, for example, an omnidirectional antenna which is well known to those of ordinary skill in the art. Sensor antenna 100 is used, for example, to survey and receive RF signals from its field of view or from an assigned sector of its field of view in a manner which is well known in the art. Sensor antenna 100 transmits RF over transmission line 500 to system processor 110.

System processor 110 is a processor which is well known to those of ordinary skill in the art and performs an analysis of the incoming signal in a manner which is well known in the art to identify the incoming signal. For example, system processor 110 identifies the signal as to such well known RF parameters as PRF (pulse repetition rates, pulse shape, pulse amplitude, and so forth. Further, system processor 110 contains a "threat library" and, together with the signal identification information, system processor 110 assigns a "threat priority" to the incoming signal. In addition, system processor 110 comprises means which are well known to those of ordinary skill in the art for synthesizing the baseband and the local oscillator (LO) frequencies for the incoming signal.

System processor 110 then transmits the LO to adaptive polarimeter 120 and to transmit and receive control units 130 and 140 (T/R control 130 and T/R control 140) over line 510. Further, system processor 110 interacts with adaptive polarimeter 120 and with T/R controls 130 and 140 over I/O lines 520. System processor 110 interacts with T/R controls 130 and 140 by sending I/O signals over lines 520 which cause them to enter a "receive mode" and system processor 110 interacts with adaptive polarimeter 120 by sending I/O signals over lines 520 which activate it for analyzing the polarization of a free space RF signal wavefront incident upon dual-polarization radiating element 150. Embodiments of dual-polarization radiating element 150 are well known to those of ordinary skill in the art and it is well known that dual-polarization radiating element 150 is a reciprocal apparatus, i.e., it will transmit RF signals as well as receive RF signals. Further, in a preferred embodiment of the present invention, dual-polarizing element 150 receives a free space RF signal having an arbitrary polarization and resolves it into two substantially orthogonal signals which are transmitted over lines 530 and 540 to T/R controls 130 and 140, respectively.

T/R controls 130 and 140 are circuits which are well known in the art such as, for example, switches, couplers, circulators and so forth, which permit a predetermined amount of the RF signal input thereto over lines 530 and 540, respectively, to pass through to adaptive polarimeter 120 over lines 550 and 560, respectively. For example, if adaptive polarimeter 120 is fabricated from solid state devices T/R controls 130 and 140 reduce the power transmitted thereto because solid state devices are not capable of handling high power signals. Further, as will be explained in detail below, in response to I/O signals sent thereto over lines 520 from system processor 110, T/R controls 130 and 140 permit: (a) a predetermined amount of the RF signal input thereto over lines 570 and 580, respectively, to pass through to adaptive polarimeter 120 over lines 550 and 560, respectively, and (b) another predetermined amount of the RF signal input thereto over lines 570 and 580, respectively, to pass to dual-polarization 150 over lines 530 and 540, respectively, for transmission.

Adaptive polarimeter 120 analyzes the polarization of the free space RF signal wavefront incident upon dual-polarizing element 150 in a manner which will be set forth in detail below in reference to FIG. 2 and transmits, for example, polarization parameters for the incident waveform over I/O lines 520 to system processor 110.

In response to the information received from adaptive polarimeter 120, system processor 110 transmits the baseband RF to techniques generator 160 over line 590. Further, identifying information for the incident wavefront is sent to techniques generator 160 over I/O lines 600. Techniques generator 160 is an apparatus which is well known to those of ordinary skill in the art and it operates in a manner well known in the art, in response to the signals transmitted thereto from system processor 110, to generate an appropriate response signal from, for example, a library of predetermined modulation responses for specific types of received signals. For example, a typical response may be to provide a modulated waveform, a staggered waveform and so forth.

Techniques generator 160 transmits an RF signal to transmit polarimeter 170 over line 610 and system processor 110 sends I/O signals to transmit polarimeter 170 over I/O line 620. Transmit polarimeter 170 is the same type of polarimeter as adaptive polarimeter 120 and will be described in detail below with respect to FIG. 3. At substantially the same time, system processor 110 sends signals to T/R controls 130 and 140 over I/0 lines 520 to cause them to enter a mode for receiving RF signals from transmit modules 180 and 190, respectively, and for transmitting a predetermined amount of those RF signals over lines 550 and 560, respectively, to adaptive polarimeter 120. Transmit modules 180 and 190 are apparatus for amplifying RF signals transmitted thereto over lines 630 and 640, respectively, from transmit polarimeter 170. Transmit modules can be any type of amplifier which is well known to those of ordinary skill in the art such as a travelling wave tube or transmit modules 180 and 190 could be a multiplicity of such apparatus.

At this time, system processor 110 sends signals to adaptive polarimeter 120 over I/0 lines 520 to activate it for analyzing the polarization of the RF signals that are input thereto from transmit polarimeter 170. As adaptive polarimeter 120 analyzes these signals it transmits signals to transmit polarimeter 170 over I/0 lines 650 to cause transmit polarimeter 170 to alter its output until adaptive polarimeter 120 receives RF signals which have the same polarization parameters that were obtained for the free space RF signal input from dual-polarizing element 150. As one can readily appreciate from this, in accordance with the present invention, all network imbalances that are caused, for example, as a result of using solid state/microwave integrated circuit technology and incurring problems due to non-reciprocity, poor frequency linearity and inadequate device repeatability, both in amplitude and phase are eliminated in a dynamic manner. At this point, the system is ready to transmit into space. System processor 110 sends a signal to T/R controls 130 and 140 over I/0 lines 520 to cause them to pass the energy transmitted thereto from transmit modules 180 and 190, respectively, to dual-polarizing element 150 and, therefrom, to free space.

As one can readily appreciate from the above, although embodiments of the present invention are applicable for use with all types of technology, embodiments of the present invention are particularly advantageous for providing apparatus which utilize monolithic, solid state technology such as monolithic GaAs solid state technology. Further, embodiments of the present invention are applicable for use with all types of power amplification apparatus for transmitting, including traveling wave tubes.

In actual deployment, as is well known to those of ordinary skill in the art, the signal polarization analysis performed by adaptive polarimeter 120 on the signal incident upon dual-polarizing element 150 and the transmit network calibration performed by adaptive polarimeter 120 on the signal generated by transmit polarimeter 170 occurs well in advance of transmission. As such, transmission polarimeter 170 would transmit the polarimeter circuit parameter settings back to system processor 110 over I/0 line 620 for storage therein in a manner well known in the art along with other information pertaining to the incoming signal of interest Further, as is well known to those of ordinary skill in the art, if the duration between the free space input signal acquisition and analysis and transmission is sufficiently long, several update cycles are possible to further refine the network settings.

In addition, in a signal dense environment, multiple free space input signals can be accommodated by using LO signals in a manner which is well known to those of ordinary skill in the art as a "filter" to distinguish among them. In such a manner, a library is generated within system processor 110 and the individual signals can be addressed at the discretion of system processor 110.

Further in addition, although FIG. 1 shows a system wherein adaptive polarimeter 120 interacts directly with transmit polarimeter 170 to cause it to vary its outputs, such an interaction could take place in a manner which should be clear to those of ordinary skill in the art through the intervention of system processor 110.

Figure 2:
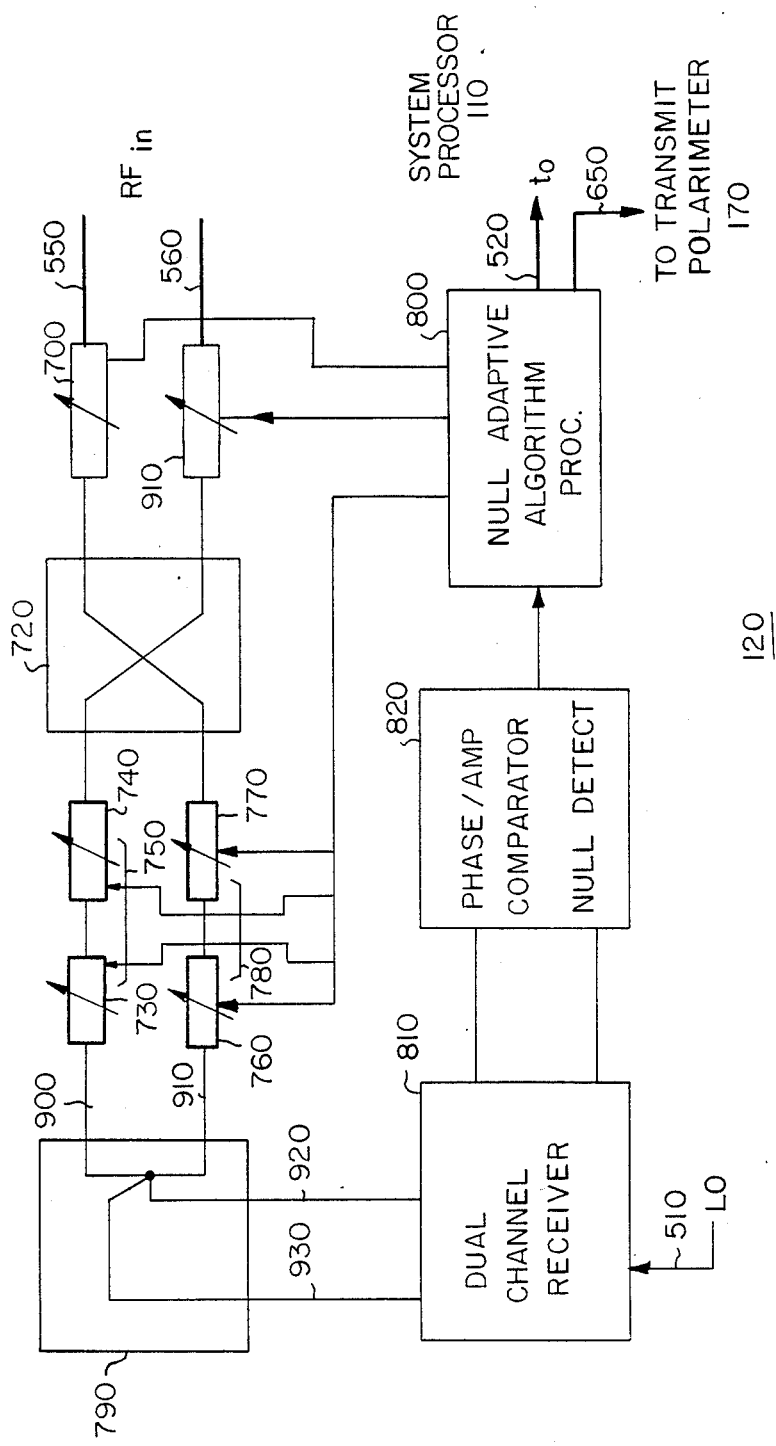
FIG. 2 shows a block diagram of an embodiment of an adaptive polarimeter utilized to fabricate the system shown in FIG. 1.

FIG. 2 shows a block diagram of adaptive polarimeter 120 of system 10 shown in FIG. 1. Adaptive polarimeter 120 operates on the well known principle that any polarization can be generated with two substantially orthogonally disposed field exciters whose amplitude and phase can be adjusted to the required values. The inputs to adaptive polarimeter 120, for purposes of analyzing an incoming free space RF signal, are obtained from dual-polarizing element 150 which has resolved the input signal into two substantially orthogonally polarized signals which are applied to adaptive polarimeter 120 over lines 550 and 560, respectively. In analyzing the input free space RF signal, adaptive polarimeter 120 undergoes a null adaptive algorithmic analysis which is well known to those of ordinary skill in the art such as a null adaptive algorithmic analysis used for monopulse detection schemes well known in the art. Such an algorithmic analysis requires the polarimeter to be able to adjust the phase and the amplitude of the orthogonal inputs to arbitrary values. In the embodiment shown in FIG. 2, the arbitrary phase adjustment is provided by two 90° analog phase shifters and the arbitrary amplitude adjustment is provided in a manner which is well known to those of ordinary skill in the art by the combination of a magic tee, two sets of phase shifters and a hybrid junction. As is well known to those of ordinary skill in the art, the amplitude of the signal strength derived from inputs to lines 550 and 560 may be varied from an amount which ranges continuously from zero to full strength.

The orthogonal polarization components of the input RF signal are input to adaptive polarimeter 120 over lines 550 and 560, which lines apply the signal as input to 90° analog phase shifters 700 and 710, respectively. As is well known to those of ordinary skill in the art, 90° analog phase shifters 700 and 710 are each apparatus which shift the phase of an RF signal which is applied as input thereto by an amount which ranges continuously from 0° to 90° in response to signals transmitted thereto from null adaptive algorithm processor 800. The outputs from analog phase shifters 700 and 710 are applied as input to hybrid 720 for combining the phase-shifted signals in a predetermined manner for application to full-360° phase shifters 750 and 780, respectively. As is well known to those of ordinary skill in the art, full-360° phase shifters 750 and 780 are each apparatus which shift the phase of an RF signal which is applied as input thereto by an amount which ranges continuously from 0° to 360° in response to signals transmitted thereto from null adaptive algorithm processor 800. Full-360° phase shifters 750 and 780 are comprised of 90° analog phase shifters 740 and 770, respectively, whose outputs are applied as input to 3-bit digital phase shifters 730 and 760, respectively. As is well known to those of ordinary skill in the art, 90° analog phase shifters 740 and 770 are each apparatus which shift the phase of an RF signal which is applied as input thereto by an amount which ranges continuously from 0° to 90° in response to signals transmitted thereto from null adaptive algorithm processor 800 and 3-bit phase digital phase shifters 730 and 760 are each apparatus which shift the phase of an RF signal which is applied as input thereto by an amount which is 180°, 90°, or 45°. Further, it is well known to those of ordinary skill in the art that the combination of 90° analog phase shifters 740 and 770 with 3-bit digital phase shifters 730 and 760, respectively, provides 360° phase shifters 750 and 780.

The outputs from 360° phase shifters 750 and 780 are applied as input to magic tee apparatus 790. Magic tee apparatus 790 is an apparatus which is well known to those of ordinary skill in the art for providing, as output, two signals. The first signal output from magic tee apparatus 790 over line 920 is the sum of the two signals input thereto over lines 900 and 910 and the second signal output from magic tee apparatus 790 over line 930 is the difference of the two signals input thereto over lines 900 and 910, shifted by 180°, i.e., the signal output over line 920 is the "sum" signal and the signal output over line 930 is the "difference" signal. Note that although we have described adaptive polarimeter 120 as being comprised of a magic tee and a hybrid, it can also be comprised of two magic tees in a manner which is well known to those of ordinary skill in the art.

Next, the sum and difference signals output from magic tee 790 over lines 920 and 930, respectively, are applied as input to dual channel receiver 810. Dual channel receiver 810 also receives an LO signal as input from system processor 110 over line 510. Dual channel receiver 810 is an apparatus which is well known to those of ordinary skill in the art which operates at IF to extract the amplitude and phase of the input signals. Dual channel receiver 810 may be comprised of a superheterodyne receiver for added sensitivity and it provides the limiting, filtering and selectivity of a receiver such as, for example, a monopulse receiver. The outputs from dual channel receiver 810 are applied as input to phase/amplitude comparator 820 for null detection in a manner which is well known to those of ordinary skill in the art by taking the ratio of the difference to the sum signal. Phase/amplitude comparator 820 may be a processor or it may be comprised of gate arrays for rapid processing of the information. Phase/amplitude comparator 820 then transmits information which is indicative of the null depth to null adaptive algorithm processor 800. As is well known to those of ordinary skill in the art, null adaptive algorithm processor 800 may be a processor or it may be comprised of gate arrays for rapid processing of the information. In a well known manner, null adaptive algorithm processor 800 analyzes the null depth applied as input thereto from phase/amplitude comparator 820 and determines the next settings for phase shifters 700, 710, 730, 740, 760, and 770 in order to determine the null of the input RF signals. As is well known to those of ordinary skill in the art, this iterative procedure proceeds until null adaptive algorithm processor 800 determines that a null depth level has been measured to a predetermined degree of accuracy or for a predetermined number of pulses. When this occurs, null adaptive algorithm processor 800 transmits the polarization parameters which describe and characterize the RF signal applied as input to adaptive polarimeter 120 to system processor 110 over lines 520. (In a mode where adaptive polarimeter 120 is used to adapt the polarization of the output from transmit polarimeter 170 to be the same as that received by dual-polarizing element 150, adaptive polarimeter 120 will transmit information to transmit polarimeter 170 over I/0 lines 650.) As a result, adaptive polarimeter 120 provides information to system processor 110 and/or to transmit polarimeter 170 which can be used to generate a signal which is substantially the same as the free space signal received by dual-polarizing element 150. Further, as described above, system processor 110 may use the parameters either in an update mode or for system deployment.

Figure 3:
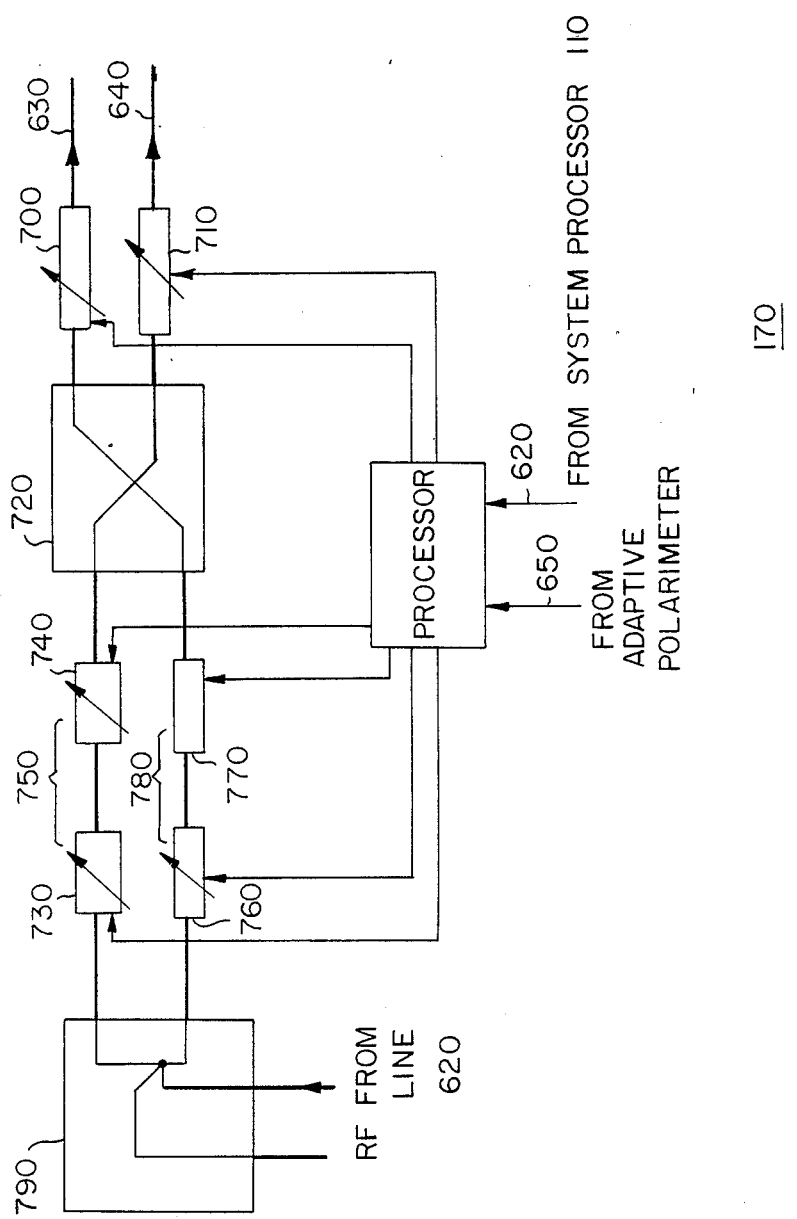
FIG. 3 shows a block diagram of an embodiment of a transmit polarimeter utilized to fabricate the system shown in FIG. 1.

FIG. 3 shows a block diagram of transmit polarimeter 170 of system 10 shown in FIG. 1. It should be clear to those of ordinary skill in the art that transmit polarimeter 170 is comprised of, for example, components which are the same as, and which operate in the same manner as, components comprising adaptive polarimeter 120 shown in FIG. 2. For example, as shown in FIG. 3, transmit polarimeter 170 is comprised of: (a) magic tee apparatus 790; (b) full-360° phase shifters 750 and 780 (full-360° phase shifters 750 and 780 being comprised of 3-bit digital phase shifters 730 and 760, respectively, whose outputs are applied as input to 90°, analog phase shifters 740 and 770, respectively); (c) hybrid 720; (d) 90° analog phase shifters 700 and 710; and (e) processor or gate array 815 for sending signals to adjust the phase of phase shifters 700, 710, 730, 740, 760, and 770. Processor or gate array 815 provides the signals to the phase shifters in response to information transmitted thereto from system processor 110 over I/0 lines 620 or in response to information transmitted thereto from adaptive polarimeter 120 over I/0 lines 650 to provide predetermined outputs over lines 630 and 640. Further, transmit polarimeter 170 provides the predetermined outputs when a predetermined RF transmit signal, which predetermined RF transmit signal is transmitted thereto over line 610, is applied, for example, to the "sum" input of magic tee 790.

It is important to note that embodiments of the present invention may be fabricated using technologies which include those in which all networks described above can be in analog or in digital chip form and can be integrated into compact modules. For example, one can utilize GaAs millimeter microwave integrated circuits such as coplanar GaAs waveguides. As has been described above, the use of adaptive polarimeter 120 in conjunction with transmit polarimeter 170 provides a means for adapting the output of transmit polarimeter 170 to take into account certain nonlinearities which are present when these integrated technologies are utilized. This provides a means for obtaining the advantages of small size and reduced manufacturing costs from these technologies in this application. In addition, the aspect of the present invention which makes it possible to utilize the solid state technology also makes it practical to utilize these technologies to provide phased array applications which were hitherto prohibitively expensive.

Figure 4:
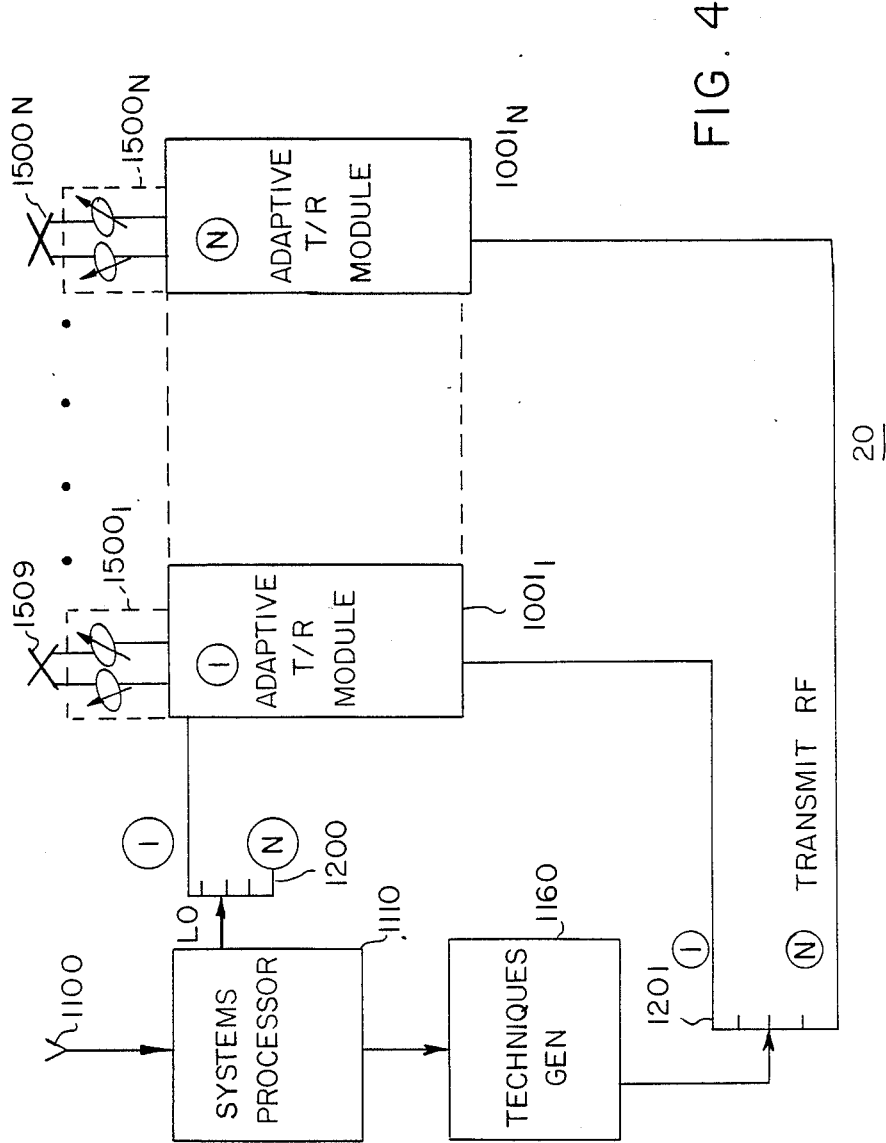
FIG. 4 shows a block diagram of a phased array system formed from a multiplicity of systems of the type shown in FIG. 1.

FIG. 4 shows a block diagram of phased array system 20 which is comprised of a multiplicity of systems of the type shown in FIG. 1. For simplicity and ease of understanding, FIG. 4 primarily shows the RF signal paths; the electronic I/0 interfaces being unaltered from those described above with respect to FIGS. 1-3.

As shown in FIG. 4, phased array system is comprised of: (a) sensor antenna 1100 which may be the same type of component as sensor antenna 100 shown in FIG. 1 and described above; (b) system processor 1110 which performs at least the same functions described above for system processor 110 shown in FIG. I; (c) techniques generator 1160 which performs the same functions described above for techniques generator 160 shown in FIG. 1; and (d) power dividers 1200 and 1201 which receive LO and a predetermined transmit RF signal from systems processor 1110 and from techniques generator 1160, respectively. Power dividers 1200 and 1201 are apparatus which are well known to those of ordinary skill in the art for receiving RF input and dividing that input for output to a multiplicity of lines. This advantageously permits the use of a single RF and LO exciter.

As shown in FIG. 4, the outputs from power dividers 1200 and 1201 are each applied, one output from each of the dividers, to adaptive T/R modules $1001_1$ to $1001_N$. Adaptive T/R modules $1001_1$ to $1001_N$ are each comprised of the components shown in FIG. 1 which are included within dotted line 950 and they operate in the same manner as has been described above for these components. The outputs from adaptive T/R modules $1001_1$ to $1001_N$ are applied as input to steering phase shifters $1600_1$ to $1600_N$, respectively. Finally, the outputs from steering phaseshifters $1600_1$ to $1600_N$ are applied as input to dual-polarizing elements $1500_1$ to $1500_N$, respectively. Dual-polarizing elements $1500_1$ to $1500_N$ are the same type of component as dual-polarizing element 150 shown in FIG. 1 and described above.

The processing and the operations performed by the components of system 20 shown in FIG. 4 are the same as those shown in FIG. 1 and described above except for one addition. As is well known to those of ordinary skill in the art, steering phase shifters $1600_1$ to $1600_N$ operate in a well known manner with systems processor 1110 to provide a direction finding function to establish the angle-of-arrival of the free space incoming signal. As a result of this determination, steering phase shifters $1600_1$ to $1600_N$ are utilized to steer the array in a well known manner. Further, as is well known to those of ordinary skill in the art, this direction finding and steering function typically does not have to be performed for system 10 shown in FIG. 1 because system 10 typically has such a wide angle of view that the output beam does not need to be moved.

As should be clear to those of ordinary skill in the art, further embodiments of the present invention may be made without departing from its teachings and all such embodiments are considered to be within the spirit of the present invention. For example, although preferred embodiments of the present invention comprise polarimeters which embody out a null detection method for determining polarization parameters, it should be clear to those of ordinary skill in the art that embodiments of the present invention may be comprised of polarimeters which embody any one of a large number of different methods for determining polarization parameters. Further, although preferred embodiments of the present invention comprise dual-polarizing elements which detect substantially orthogonal polarization components, it should be clear to those of ordinary skill in the art that embodiments of the present invention may comprise dual-polarizing elements which detect arbitrary pairs of polarization components. Still further, transmit modules 180 and 190 may produce reduced power during the adaptive tuning phase of operation of the inventive system and they may produce full power during the signal transmission phase of operation of the inventive system. Therefore, it is intended that all matter contained in the above description or shown in the accompanying drawings shall be interpreted as illustrative and not limiting.

What is claimed is:

1. A polarization adaptive active aperture systems which comprises:
   a dual-polarizing element for receiving an RF signal and for providing two polarization components thereof and for receiving two polarization components of an RF signal and for transmitting the RF signal;
   switching means for transmitting a first predetermined portion of each polarization component applied therefrom from the dual-polarizing element and indicative of said RF signal to a receive polarimeter;
   the receive polarimeter for determining predetermined polarization parameters of the RF signal from the predetermined portion of each polarization component and for transmitting the parameters to a controller;
   the controller for generating a predetermined RF signal and for transmitting the polarization parameters to a transmit polarimeter;
   the transmit polarimeter for generating two transmit polarization components in response to the predetermined RF signal and the associated polarization parameters; and
   means for amplifying the two transmit polarization components from the transmit polarimeter and for applying the amplified outputs to the switching means for transmitting a second predetermined portion of the amplified outputs to the receive polarimeter.

2. The system of claim 1 wherein:
   the controller transmits polarization parameters to the receive polarimeter; and
   the receive polarimeter determines transmit polarization parameters from the transmit polarization components and transmits the polarization parameters and the transmit polarization parameters to the transmit polarimeter.

3. The system of claim 1 wherein:
   the controller transmits polarization parameters to the receive polarimeter;
   the receive polarimeter determines transmit polarization parameters from the transmit polarization components and transmits the transmit polarization parameters to the controller.

4. The system of claim 2 wherein the transmit polarimeter alters the transmit polarization components in response to receiving the polarization parameters and the transmit polarization parameters from the receive polarimeter.

5. The system of claim 3 wherein the transmit polarimeter alters the transmit polarization components in response to receiving altered polarization parameters from the controller.

6. The system of claim 5 wherein the receive polarimeter is fabricated from solid state integrated microwave circuits.

7. The system of claim 6 wherein the transmit polarimeter is fabricated from solid state integrated microwave circuits.

8. The system of claim 7 wherein the polarization components are substantially orthogonally polarized components.

9. The system of claim 8 wherein the receive polarimeter determines the polarization parameters by means of null detection.

10. The system of claim 9 wherein the receive polarimeter comprises means for varying the phase of the polarization components input thereinto by an arbitrary amount from 0° to 360° and means for varying the amplitude of the polarization components input thereinto by an arbitrary amount from 0 to full signal strength.

11. The system of claim 10 wherein the means for varying the amplitude comprises: a hybrid, means for shifting the phase by an amount from 0° to 360°, and a magic tee.

12. The system of claim 10 wherein the means for varying the amplitude comprises: a magic tee, means for shifting the phase by an amount from 0° to 360°, and a magic tee.

13. A phase array adaptive active aperture system which comprises a controller and a multiplicity of systems, at least one of which systems comprises:
   a dual-polarizing element for receiving an RF signal and for providing two polarization components thereof and for receiving two polarization components of an RF signal and for transmitting the RF signal;
   means, cooperating with the controller, for determining the direction of the RF signal;
   switching means for transmitting a first predetermined portion of each polarization component from said RF signal and applied thereto from the dual-polarizing element to a receive polarimeter;
   the receive polarimeter for determining predetermined polarization parameters of the RF signal from the predetermined portion of each polarization component and for transmitting the parameters to the controller, the controller for generating a predetermined RF signal and for transmitting the polarization parameters to a transmit polarimeter;
   the transmit polarimeter for generating two polarization components in response to the predetermined RF signal and the associated polarization parameters; and
   means for amplifying the two transmit polarization components from the transmit polarimeter and for applying the amplified outputs to the switching means for transmitting a second predetermined portion of the amplified outputs to the receive polarimeter.

* * * * *